(12) United States Patent
Shikata et al.

(10) Patent No.: US 11,794,191 B2
(45) Date of Patent: Oct. 24, 2023

(54) DISPENSING TIP HOLDER

(71) Applicant: SHIMADZU CORPORATION, Kyoto (JP)

(72) Inventors: Masamitsu Shikata, Kyoto (JP); Kenji Ninomiya, Kyoto (JP); Naoko Takaoka, Kyoto (JP); Shinichiro Kobayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 387 days.

(21) Appl. No.: 16/942,843

(22) Filed: Jul. 30, 2020

(65) Prior Publication Data

US 2021/0031205 A1    Feb. 4, 2021

(30) Foreign Application Priority Data

Jul. 30, 2019   (JP) .................................. 2019-140205

(51) Int. Cl.
*B01L 3/00* (2006.01)
*B01L 9/00* (2006.01)
*G01N 35/10* (2006.01)

(52) U.S. Cl.
CPC .............. *B01L 9/543* (2013.01); *G01N 35/10* (2013.01); *B01L 2200/025* (2013.01); *B01L 2300/04* (2013.01); *G01N 2035/103* (2013.01)

(58) Field of Classification Search
CPC ............... B01L 9/543; B01L 2200/025; B01L 2300/04; B01L 2300/0609; B01L 3/50825;

(Continued)

(56) References Cited

U.S. PATENT DOCUMENTS

| 2003/0121815 A1 | 7/2003 | Bergeron et al. |
| 2003/0147781 A1 | 8/2003 | Viot |
| 2022/0134325 A1* | 5/2022 | Hilgenberg ........... B01L 3/0213 73/864.14 |

FOREIGN PATENT DOCUMENTS

| CN | 1429124 A | 7/2003 |
| CN | 101332439 A | 12/2008 |

(Continued)

OTHER PUBLICATIONS

Combined Chinese Office Action and Search Report dated Apr. 19, 2022 in Chinese Patent Application No. 202010721735.9 (with English translation of Office Action only), 12 pages.

(Continued)

*Primary Examiner* — Jennifer Wecker
*Assistant Examiner* — Oyeleye Alexander Alabi
(74) *Attorney, Agent, or Firm* — Oblon, McClelland, Maier & Neustadt, L.L.P.

(57) ABSTRACT

A dispensing tip holder is used when a dispensing tip is attached to a tip of a pipette, and includes a peripheral wall having a shape surrounding an outer peripheral surface of the dispensing tip, and an insertion portion having an insertion opening into which the dispensing tip is to be inserted. The peripheral wall has a first end into which the dispensing tip is to be inserted, and has a second end provided at a position opposite to the first end. The insertion portion is formed in the peripheral wall such that an outer peripheral surface of the dispensing tip abuts against an edge of the insertion opening, and is formed in the peripheral wall such that a tip of the dispensing tip does not project from the second end of the peripheral wall, when the dispensing tip is inserted into the insertion opening from the first end.

20 Claims, 5 Drawing Sheets

(58) Field of Classification Search
CPC ... G01N 35/10; G01N 2035/103; B65D 61/00
See application file for complete search history.

(56) References Cited

FOREIGN PATENT DOCUMENTS

| | | |
|---|---|---|
| CN | 206871598 U | 1/2018 |
| JP | 06-057427 U | 8/1994 |
| JP | 10-48222 A | 2/1998 |
| JP | 2001-523812 A | 11/2001 |
| JP | 2003-530211 A | 10/2003 |
| JP | 2003-533292 A | 11/2003 |
| JP | 2007-253118 A | 10/2007 |
| JP | 2010-155223 A | 7/2010 |
| JP | 2018-91670 A | 6/2018 |
| WO | WO-2012111287 A1 * | 8/2012 ............. B01L 3/508 |

OTHER PUBLICATIONS

Combined Chinese Office Action and Search Report dated Dec. 3, 2021 in corresponding Chinese Patent Application No. 202010721735.9 (with English Translation and English Translation of Category of Cited Documents), 12 pages.

Office Action dated Oct. 4, 2022, in corresponding Japanese Patent Application No. 2019-140205 (with English Translation), 9 pages.

Chinese Office Action dated Jul. 8, 2022 in Chinese Patent Application No. 202010721735.9 (with unedited computer generated English translation), 9 pages.

* cited by examiner

DISPENSING TIP HOLDER

BACKGROUND OF THE INVENTION

Field of the Invention

The present invention relates to a dispensing tip holder.

Description of Related Art

In the analysis of various liquid samples, a pipette is used to extract and discharge a very small amount of a liquid sample (see JP 2003-530221 A and JP 2010-155223 A, for example). A dispensing tip (pipette tip) is attached to the tip of the pipette. The dispensing tip has a conical shape with a narrowed tip, and an opening is formed at the tip (see JP 6-57427 A, for example). Normally, a plurality of dispensing tips are stored in a dedicated rack by being held vertically in a plurality of fixed holes of the rack.

BRIEF SUMMARY OF THE INVENTION

Meanwhile, dispensing tips may be individually packaged one by one from the viewpoint of sterilization or the like. In this case, a user takes out a dispensing tip from a packaging material and attaches the dispensing tip to the tip of a pipette while holding the dispensing tip with his or her fingertips. In this case, it is necessary to attach the dispensing tip reliably to the tip of the pipette. In a case where the dispensing tip is not attached reliably to the tip of the pipette, a liquid sample might not be sucked or discharged by a necessary amount. Further, in a case where the dispensing tip is loosely attached to the pipette, the dispensing tip may come off the tip of the pipette during a dispensing work. In particular, in a case where the tip of the pipette has worn away due to a long-term use, the dispensing tip is likely to come off.

However, it is not easy to attach the dispensing tip to the tip of the pipette with a suitable force while holding the dispensing tip with one's fingertips. In a case where the user presses the dispensing tip into the tip of the pipette with a relatively large force while holding the dispensing tip with his or her fingertips, the dispensing tip may become deformed due to the contact of his or her palm with the tip of the dispensing tip.

An object of the present invention is to provide a dispensing tip holder that enables a dispensing tip to be attached easily and reliably to a tip of a pipette.

One aspect of the present invention relates to a dispensing tip holder that is used when a dispensing tip is attached to a tip of a pipette and includes a peripheral wall having a shape surrounding an outer peripheral surface of the dispensing tip, and an insertion portion having an insertion opening into which the dispensing tip is to be inserted, wherein the peripheral wall has a first end into which the dispensing tip is to be inserted, and has a second end provided at a position opposite to the first end, and the insertion portion is formed in the peripheral wall such that an outer peripheral surface of the dispensing tip abuts against an edge of the insertion opening, and is formed in the peripheral wall such that a tip of the dispensing tip does not project from the second end of the peripheral wall, when the dispensing tip is inserted into the insertion opening from the first end.

The present invention enables provision of a dispensing tip holder that enables a dispensing tip to be attached easily and reliably to a tip of a pipette.

Other features, elements, characteristics, and advantages of the present invention will become more apparent from the following description of preferred embodiments of the present invention with reference to the attached drawings.

DESCRIPTION OF THE PREFERRED EMBODIMENTS

A dispensing tip holder according to embodiments will be described below in detail with reference to the drawings.

(1) Dispensing Tip Holder According to First Embodiment

Figure 1:
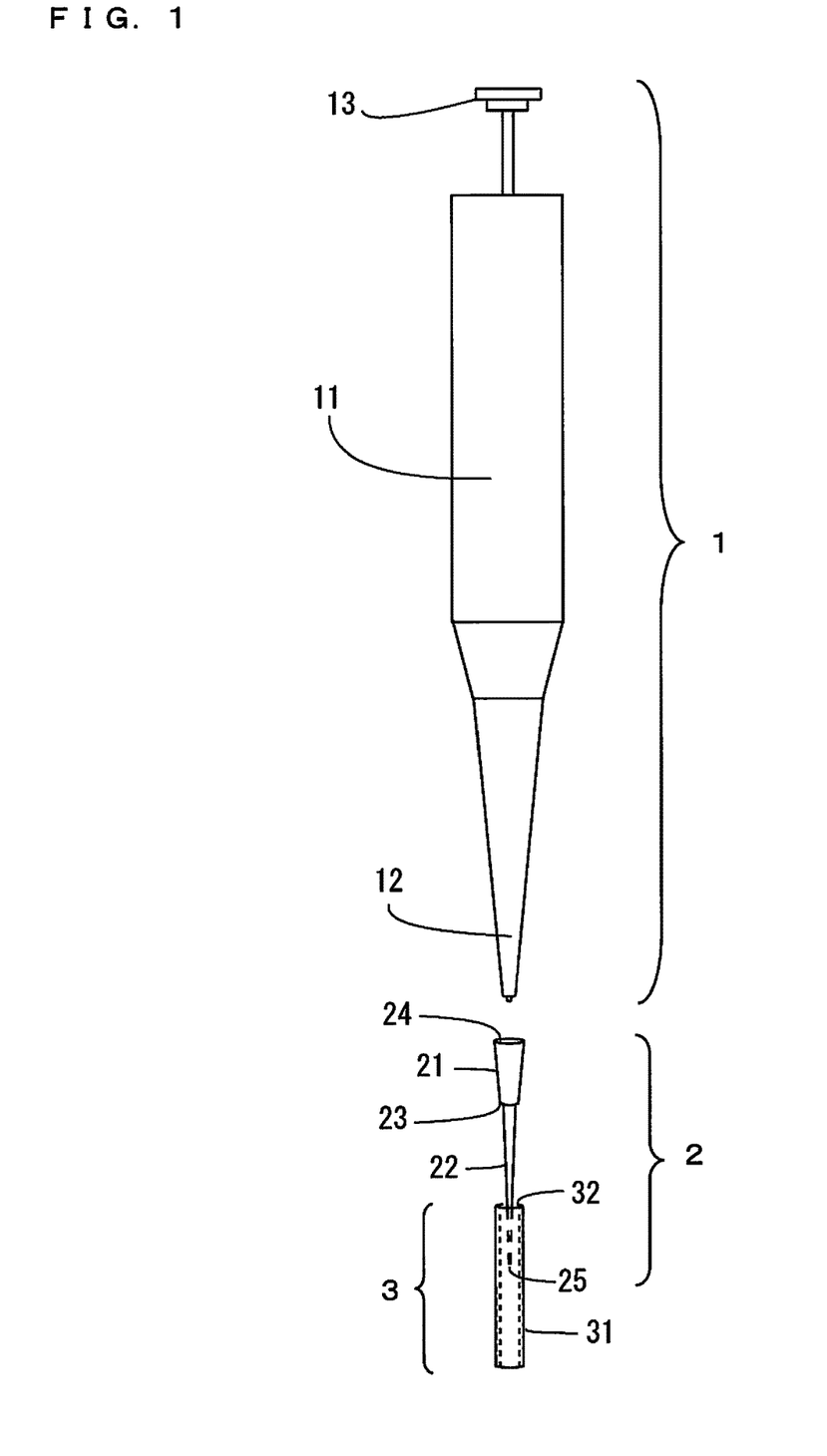
FIG. 1 is a schematic diagram showing a pipette, a dispensing tip and a dispensing tip holder according to a first embodiment that are used for a dispensing work.

FIG. 1 is a schematic diagram showing a pipette, a dispensing tip, and a dispensing tip holder according to a first embodiment, which are used for a dispensing work.

The pipette 1 of FIG. 1 has a pipette body 11, a nose cone 12 and a push button 13. A piston rod and a piston rod drive mechanism are stored in the pipette body 11. The nose cone 12 has a truncated cone shape. The dispensing tip 2 is attached to the nose cone 12. The piston rod drive mechanism moves the piston rod in an up-and-down direction by an operation of the push button 13. Thus, a liquid sample is sucked into the dispensing tip 2 attached to the nose cone 12, or the liquid sample in the dispensing tip 2 is discharged.

The dispensing tip 2 has a holder 21 having a truncated cone shape and a main body 22 having a cone shape. The upper end of the main body 22 is formed integrally with the lower end of the holder 21. The outer diameter of the upper end of the main body 22 is smaller than the outer diameter of the lower end of the holder 21. Thus, a circular step 23 is formed between the holder 21 and the main body 22. The holder 21 has a circular upper end opening 24. A hole 25 is formed in the lower end (tip) of the main body 22. In the dispensing tip 2, a thin elongated conical space in which the holder 21 and the main body 22 communicate with each other is formed.

Figure 2:
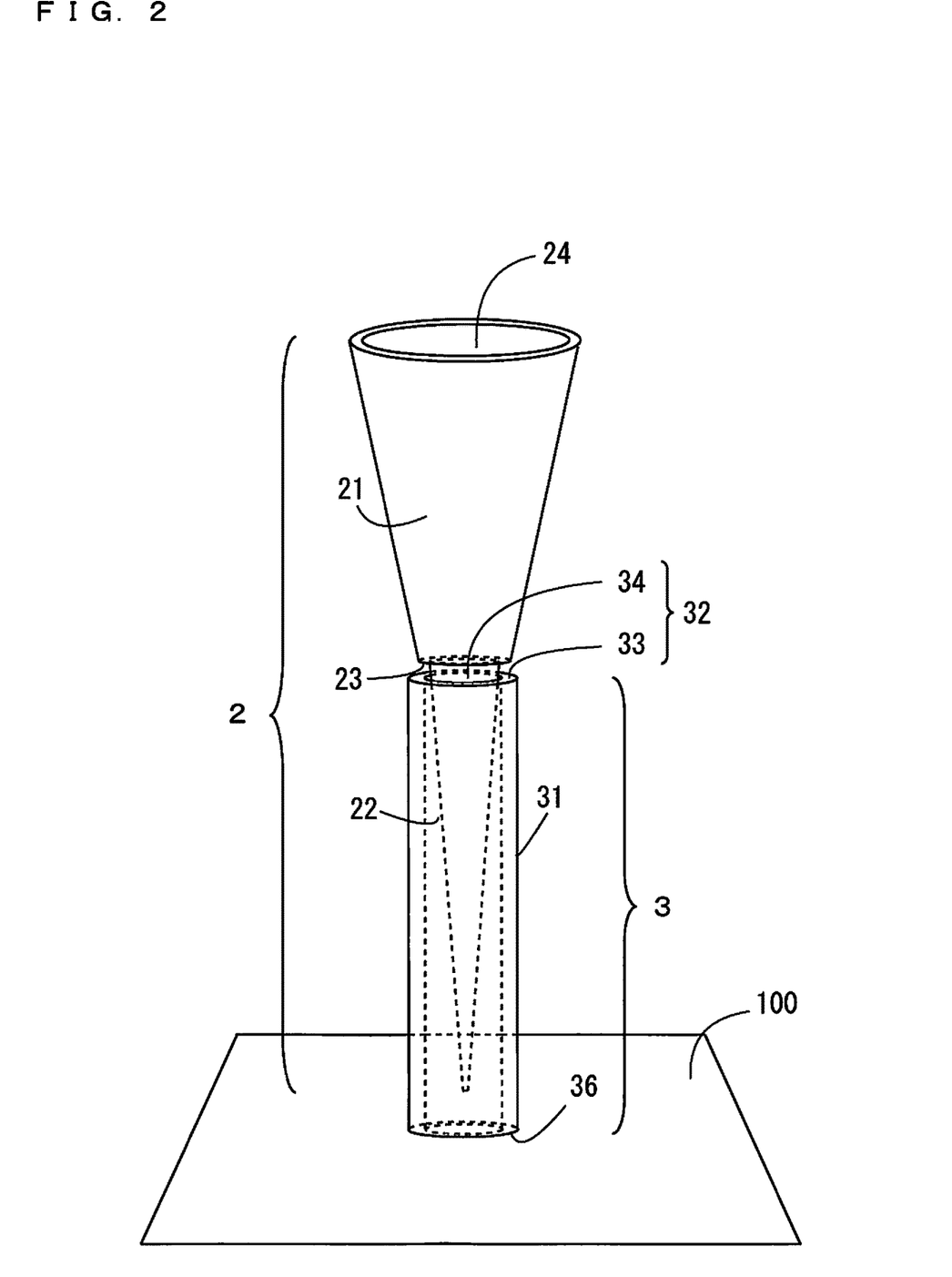
FIG. 2 is a perspective view showing a dispensing tip being inserted into the dispensing tip holder according to the first embodiment.

FIG. 2 is a perspective view of the dispensing tip 2 being inserted into the dispensing tip holder 3 of FIG. 1. As shown in FIG. 2, the dispensing tip holder 3 includes a peripheral wall 31 and an insertion portion 32. In the present embodiment, the peripheral wall 31 is cylindrical. Thus, a circular upper end opening is formed at the upper end of the peripheral wall 31. Further, a circular lower end opening is formed at the lower end of the peripheral wall 31.

In the present embodiment, the insertion portion 32 has an annular abutment surface 33 formed of the upper end surface of the peripheral wall 31. Further, the insertion portion 32 has an insertion opening 34 formed of the upper end opening of the peripheral wall 31. In this case, part of the peripheral wall 31 is the insertion portion 32.

In the present embodiment, the main body 22 of the dispensing tip 2 is inserted into the peripheral wall 31 from the insertion opening 34. Thus, the abutment surface 33 of the insertion portion 32 of the dispensing tip holder 3 abuts against the step 23 of the dispensing tip 2. In a case where the step 23 is not present between the holder 21 and the main body 22 of the dispensing tip 2, the abutment surface 33 of the dispensing tip holder 3 abuts against the holder 21 or the tapered outer peripheral surface of the main body 22 of the dispensing tip 2. The length of the peripheral wall 31 is set such that the tip of the dispensing tip 2 does not project from the lower end of the peripheral wall 31 with the dispensing tip 2 inserted into the insertion opening 34.

An annular support surface 36 is formed at the lower end surface of the peripheral wall 31. The dispensing tip holder 3 is placed on a fixed surface 100 such as an upper surface of a table. Thus, the insertion opening 34 is directed upwardly with the support surface 36 of the peripheral wall 31 in contact with the fixed surface 100. A bottom portion may be provided at the lower end of the peripheral wall 31. In this case, the lower surface of the bottom portion is the support surface 36.

When attaching the dispensing tip 2 to the pipette 1, a user inserts the main body 22 of the dispensing tip 2 into the peripheral wall 31 from the insertion opening 34 of the dispensing tip holder 3. The dispensing tip holder 3 is placed on the fixed surface 100. In this state, a tip portion of the nose cone 12 of the pipette 1 of FIG. 1 is inserted into the upper end opening 24 of the dispensing tip 2. The support surface 36 of the dispensing tip holder 3 is supported by the fixed surface 100, and the outer peripheral surface of the dispensing tip 2 abuts against the abutment surface 33 of the dispensing tip holder 3. At this time, the user may hold the dispensing tip holder 3 lightly with his or her fingertips. In a case where the dispensing tip holder 3 is supported stably on the fixed surface 100, the user does not have to hold the dispensing tip holder 3 with his or her fingertips. In this state, the user can attach the dispensing tip 2 to the nose cone 12 of the pipette 1 by pressing the pipette 1 downwardly with a suitable force. In this case, because the tip of the dispensing tip 2 does not come into contact with the fixed surface 100, the dispensing tip 2 does not become deformed. Therefore, the user can attach the dispensing tip 2 easily and reliably to the tip portion of the nose cone 12 of the pipette 1.

(2) Dispensing Tip Holder According to Second Embodiment

Figure 3:
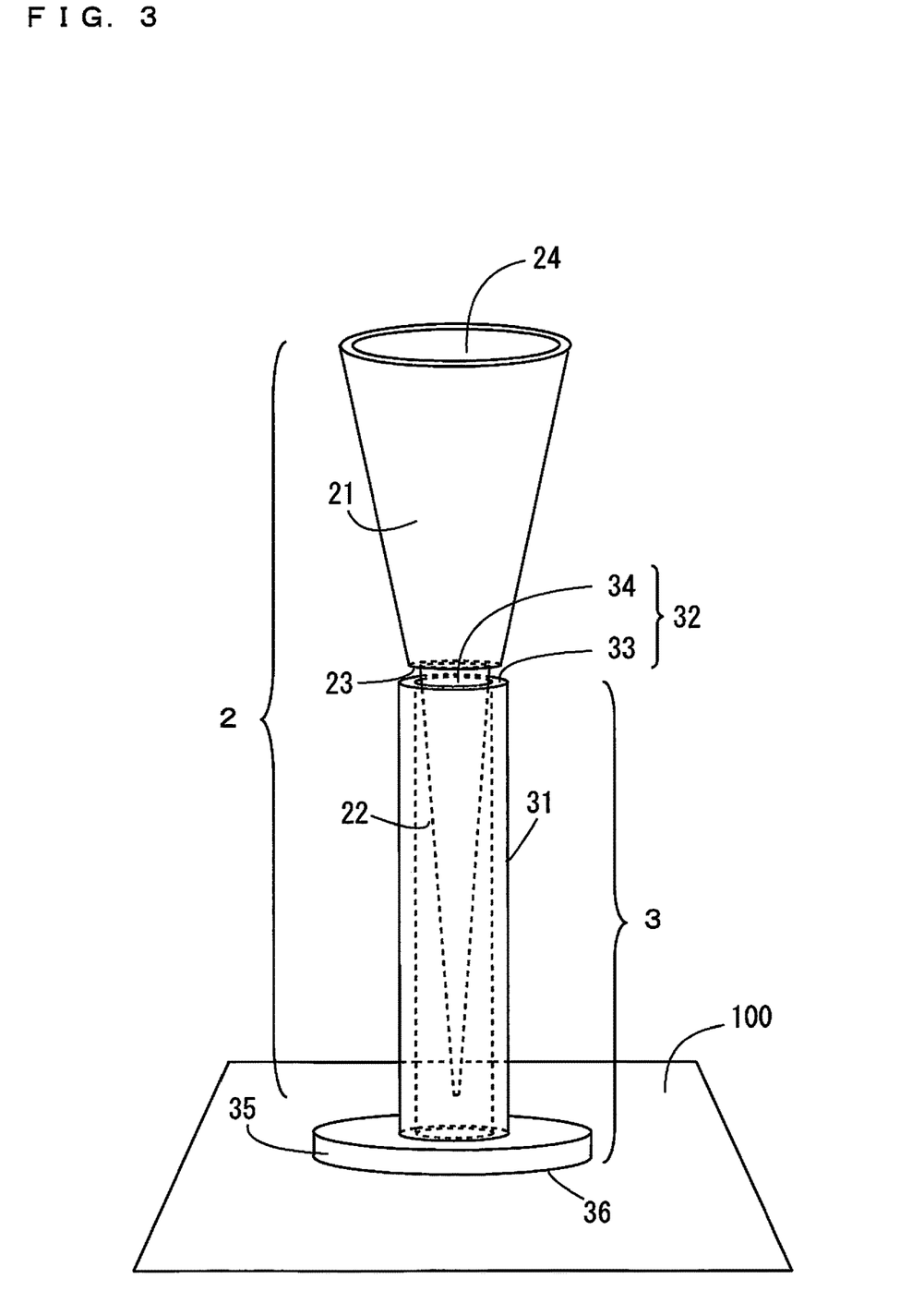
FIG. 3 is a perspective view showing a dispensing tip holder according to a second embodiment.

FIG. 3 is a perspective view showing a dispensing tip holder according to a second embodiment. The dispensing tip holder 3 of FIG. 3 is different from the dispensing tip holder 3 of FIG. 2 in the following point. In the dispensing tip holder 3 of FIG. 3, a circular base 35 is attached to the lower end surface of the peripheral wall 31. In the present embodiment, the lower surface of the base 35 is the support surface 36. The base 35 is formed to project outwardly from the peripheral wall 31. The shape of the base 35 is not limited to a circle but may be a polygon such as a square or another shape such as an oval. The configuration of the other parts of the dispensing tip holder 3 of FIG. 3 is similar to the configuration of the corresponding parts of the dispensing tip holder 3 of FIG. 2.

With the dispensing tip holder 3 according to the present embodiment, the peripheral wall 31 stands up more stably on the fixed surface 100. Therefore, the user can attach the dispensing tip 2 easily and reliably to the tip portion of the nose cone 12 of the pipette 1 without holding the dispensing tip 2 with his or her fingertips.

(3) Dispensing Tip Holder According to Third Embodiment

Figure 4:
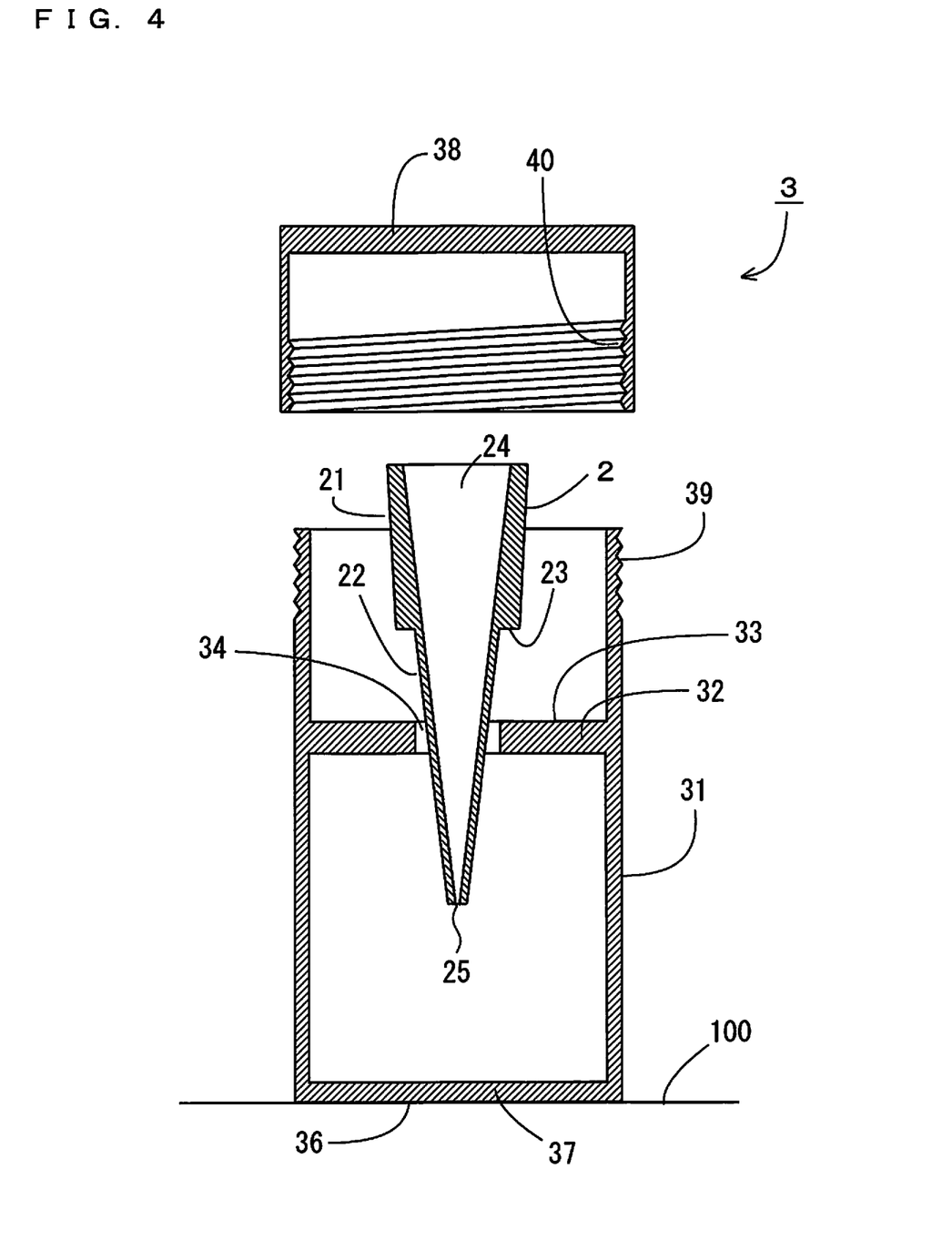
FIG. 4 is a cross sectional view showing a dispensing tip holder according to a third embodiment.

FIG. 4 is a cross sectional view showing a dispensing tip holder according to a third embodiment. The dispensing tip holder 3 of FIG. 4 includes a cylindrical peripheral wall 31 and a plate-shaped insertion portion 32. A circular upper end opening is formed at the upper end of the peripheral wall 31. Further, a bottom portion 37 is formed at the lower end of the peripheral wall 31. In the present embodiment, the lower surface of the bottom portion 37 is the support surface 36.

An insertion portion 32 is formed at a position spaced apart from the upper end of the peripheral wall 31 by a predetermined distance in the peripheral wall 31. Further, the insertion portion 32 is provided at the height such that the distance from the bottom portion 37 to the insertion portion 32 is larger than the length of the main body 22 of the dispensing tip 2. A circular insertion opening 34 is formed in the center portion of the insertion portion 32. Thus, the insertion portion 32 has an annular abutment surface 33.

The dispensing tip holder 3 of FIG. 4 further includes a lid 38. The lid 38 has a shape that can be fitted to the upper end of the peripheral wall 31. A male screw 39 is formed in an upper region of the outer peripheral surface of the peripheral wall 31. A female screw 40 corresponding to the male screw 39 is formed in a lower region of the inner peripheral surface of the lid 38.

When attaching the dispensing tip 2 to the pipette 1 of FIG. 1, the user inserts the main body 22 of the dispensing tip 2 into the insertion opening 34 from the upper end opening of the peripheral wall 31 of the dispensing tip holder 3. Thus, the abutment surface 33 of the insertion portion 32 of the dispensing tip holder 3 abuts against the step 23 of the dispensing tip 2. In this case, the tip of the dispensing tip 2 does not come into contact with the bottom portion 37 of the dispensing tip holder 3. The dispensing tip holder 3 is placed on the fixed surface 100. In this state, the tip portion of the nose cone 12 of the pipette 1 of FIG. 1 is inserted into the upper end opening 24 of the dispensing tip 2. The support surface 36 of the dispensing tip holder 3 is supported on the fixed surface 100, and the outer peripheral surface of the dispensing tip 2 abuts against the edge of the insertion opening 34 of the dispensing tip holder 3. In this state, the user can attach the dispensing tip 2 to the nose cone 12 of the pipette 1 by pressing the pipette 1 downwardly with a suitable force. In this case, because the tip of the dispensing tip 2 does not come into contact with the fixed surface 100, the dispensing tip 2 does not become deformed. Therefore, the user can attach the dispensing tip 2 easily and reliably to the tip portion of the nose cone 12 of the pipette 1.

After using the dispensing tip 2, the user inserts the dispensing tip 2 attached to the nose cone 12 of the pipette 1 into the insertion opening 34 from the upper end opening of the peripheral wall 31 of the dispensing tip holder 3, and detaches the dispensing tip 2 from the pipette 1. In this state, the user attaches the lid 38 to the upper end of the peripheral wall 31. In this case, the user screws the female screw 40 of the lid 38 into the male screw 39 of the peripheral wall 31. Thus, the upper end opening of the peripheral wall 31 is closed by the lid 38.

With the dispensing tip holder 3 according to the present embodiment, the user can insert the dispensing tip 2 easily and reliably into the tip portion of the nose cone 12 of the pipette 1 similarly to the dispensing tip holders 3 according to the first and second embodiments. Further, because the lid 38 is attached to the dispensing tip holder 3, the dispensing tip holder 3 can be shielded more easily from contaminants in an environment or can be sterilized more easily, than a case where the dispensing tip holder 3 is packaged in a packaging bag.

Further, the user can discard the dispensing tip 2 without coming into contact with a liquid sample after using the dispensing tip holder 3. Therefore, the dispensing tip 2 to which a sample including infectivity such as a biohazardous sample or a substance causing environmental pollution is attached can be discarded safely.

(4) Dispensing Tip Holder According to Fourth Embodiment

Figure 5:
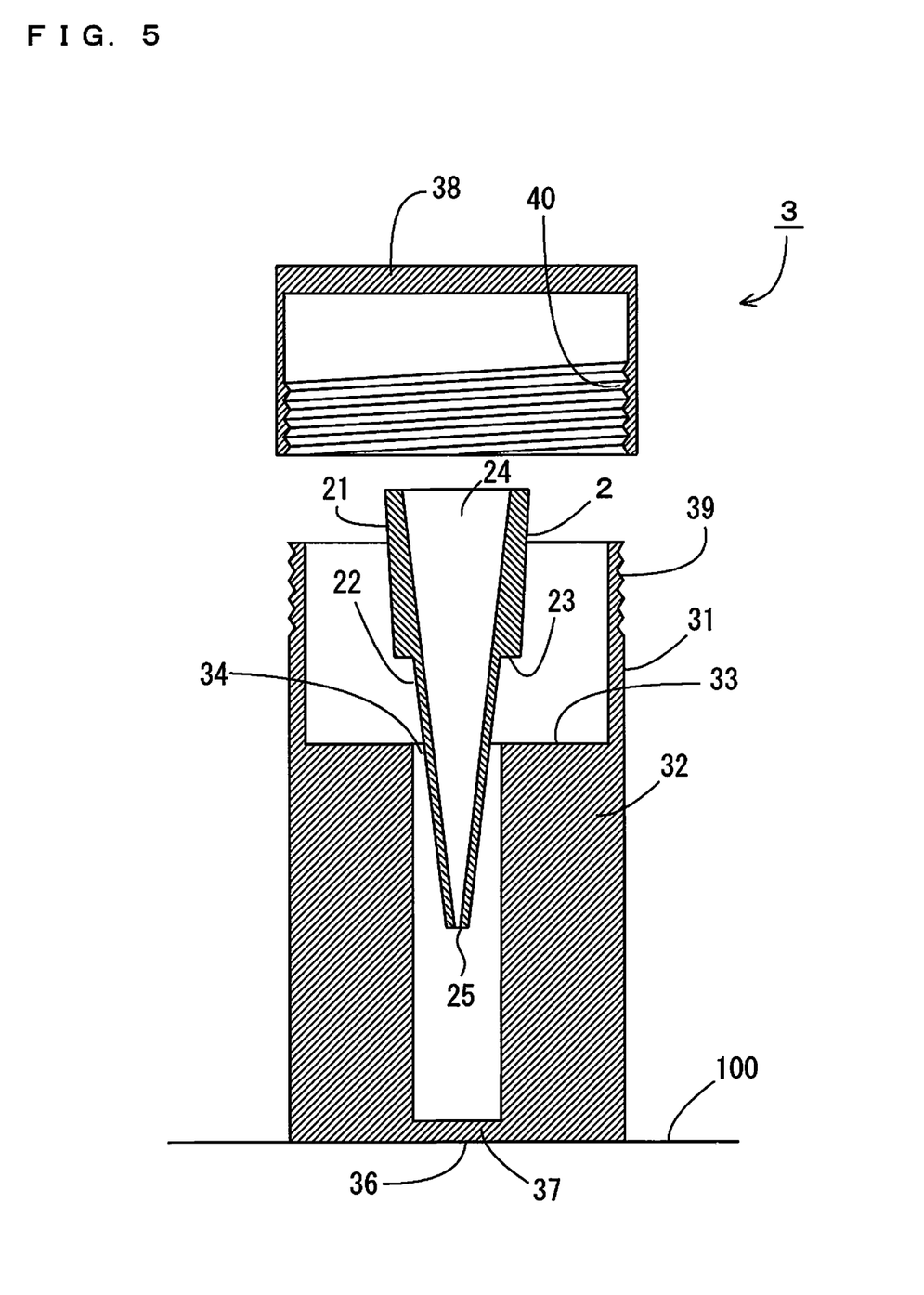
FIG. 5 is a cross sectional view showing a dispensing tip holder according to a fourth embodiment.

FIG. 5 is a cross sectional view showing a dispensing tip holder according to a fourth embodiment. The dispensing tip holder 3 of FIG. 5 is different from the dispensing tip holder 3 of FIG. 4 in the following points. In the dispensing tip holder 3 according to the present embodiment, a cylindrical insertion portion 32 integrated with the inner peripheral surface of the peripheral wall 31 is provided instead of the plate-shaped insertion portion 32 of FIG. 4. A columnar insertion opening 34 is formed in the insertion portion 32. The configuration of other parts of the dispensing tip holder 3 of FIG. 5 is similar to the configuration of the corresponding parts of the dispensing tip holder 3 of FIG. 4.

With the dispensing tip holder 3 according to the present embodiment, the user can attach the dispensing tip 2 easily and reliably into the tip portion of the nose cone 12 of the pipette 1 similarly to the dispensing tip holders 3 according to the first to third embodiments. Further, because the lid 38 is attached to the dispensing tip holder 3, the dispensing tip holder 3 can be shielded more easily from contaminants in an environment or can be sterilized more easily, than a case where the dispensing tip holder 3 is packaged in a packaging bag.

Further, similarly to the dispensing tip holder 3 according to the third embodiment, the user can discard the dispensing tip 2 without coming into contact with a liquid sample after using the dispensing tip holder 3. Therefore, the dispensing tip 2 to which a sample including infectivity such as a biohazardous sample or a substance causing environmental pollution is attached can be discarded safely.

Further, in the dispensing tip holder 3 according to the present embodiment, because the inner surface of the peripheral wall 31 has a simple configuration, a manufacturer can manufacture the dispensing tip holder 3 easily.

(5) Other Embodiments

The lid 38 may be provided in the dispensing tip holder 3 of FIGS. 1, 2 and 3. Further, in the dispensing tip holder 3 of FIGS. 4 and 5, the male screw 39 and the female screw 40 do not have to be formed. Further, in the dispensing tip holder 3 of FIGS. 4 and 5, the lid 38 does not have to be provided. Furthermore, the bottom portion 37 does not have to be provided in the dispensing tip holder 3 of FIGS. 4 and 5.

(6) Correspondences Between Constituent Elements in Claims and Parts in Preferred Embodiments In the following paragraphs, non-limiting examples of correspondences between various elements recited in the claims below and those described above with respect to various preferred embodiments of the present invention are explained. In the above-mentioned embodiment, the upper end is an example of a first end, the lower end is an example of a second end and the base 35 is an example of a support plate. As each of various constituent elements recited in the claims, various other elements having configurations or functions described in the claims can be also used.

(7) Aspects

The plurality of above-mentioned exemplary embodiments are interpreted as specific examples of the below-mentioned aspects by those skilled in the art.

(Item 1) A dispensing tip holder according to one aspect that is used when a dispensing tip is attached to a tip of a pipette may include a peripheral wall having a shape surrounding an outer peripheral surface of the dispensing tip, and an insertion portion having an insertion opening into which the dispensing tip is to be inserted, wherein the peripheral wall may have a first end into which the dispensing tip is to be inserted, and may have a second end provided at a position opposite to the first end, and the insertion portion may be formed in the peripheral wall such that an outer peripheral surface of the dispensing tip abuts against an edge of the insertion opening, and may be formed in the peripheral wall such that a tip of the dispensing tip does not project from the second end of the peripheral wall, when the dispensing tip is inserted into the insertion opening from the first end.

With the dispensing tip holder according to the item 1, the user inserts the tip of the dispensing tip into the insertion opening of the insertion portion of the dispensing tip holder. Thus, the outer peripheral surface of the dispensing tip abuts against the edge of the insertion opening of the dispensing tip holder. In this case, the tip of the dispensing tip does not project from the second end of the peripheral wall.

The user can attach the dispensing tip to the tip of the pipette with a suitable force with the second end of the peripheral wall abutting against the fixed surface by pressing the pipette downwardly with the suitable force. In this case, because the tip of the dispensing tip does not come into contact with any part, the dispensing tip does not become deformed. Therefore, the user can attach the dispensing tip easily and reliably to the tip of the pipette.

(Item 2) In the dispensing tip holder according to the item 1, the peripheral wall may be cylindrical, and the second end of the peripheral wall may have a support surface that is contactable with a fixed surface.

With the dispensing tip holder according to the item 2, the user can cause the cylindrical peripheral wall to stand on the fixed surface by placing the dispensing tip holder on the fixed surface. Further, the user can insert the pipette easily into the dispensing tip without holding the dispensing tip holder with his or her fingertips.

(Item 3) In the dispensing tip holder according to the item 1, the first end of the peripheral wall may have an annular abutment surface that abuts against an outer peripheral surface of the dispensing tip, and the insertion portion may be formed of the abutment surface of the peripheral wall, and the insertion opening of the insertion portion may be an opening surrounded by the abutment surface.

With the dispensing tip holder according to the item 3, the user inserts the tip of the dispensing tip into the insertion opening of the insertion portion of the dispensing tip holder. Thus, the outer peripheral surface of the dispensing tip abuts against the insertion opening of the dispensing tip holder. In this case, the tip of the dispensing tip does not project from the second end of the peripheral wall.

The user can attach the dispensing tip to the tip of the pipette with a suitable force with the second end of the peripheral wall abutting against the fixed surface by pressing the pipette downwardly with the suitable force. In this case, because the tip of the dispensing tip does not come into contact with any part, the dispensing tip does not become deformed. Therefore, the user can attach the dispensing tip easily and reliably to the tip of the pipette.

(Item 4) The dispensing tip holder according to the item 1 may further include a support plate provided at the second end of the peripheral wall.

With the dispensing tip holder according to the item 4, the support plate provided at the second end of the peripheral wall abuts against the fixed surface, whereby the dispensing tip holder can stand up vertically. Therefore, the user can attach the dispensing tip stably to the tip of the pipette with a suitable force by pressing the pipette downwardly with the suitable force.

(Item 5) In the dispensing tip holder according to the item 1, the insertion portion may be provided in the peripheral wall such that the insertion opening is located at a position spaced apart from the first end in the peripheral wall.

With the dispensing tip holder according to the item 5, the user inserts the dispensing tip attached to the nose cone of the pipette into the insertion opening and detaches the dispensing tip from the pipette after using the dispensing tip. In this case, a large part of the used dispensing tip is stored in the peripheral wall. Therefore, the user can suppress the contact with a sample adhering to the used dispensing tip.

(Item 6) The dispensing tip holder according to the item 1 may further include a lid that is attachable to and detachable from the first end of the peripheral wall.

With the dispensing tip holder according to the item 6, the user inserts the dispensing tip attached to the nose cone of the pipette into the insertion opening from the upper end opening of the peripheral wall of the dispensing tip holder and detaches the dispensing tip from the pipette after using the dispensing tip. In this state, the user attaches the lid to the first end of the peripheral wall. In this case, the upper end opening of the peripheral wall is closed by the lid. Thus, the contact of the user with a sample attached to the dispensing tip can be suppressed after the use of the dispensing tip until discard of the dispensing tip.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. A dispensing tip holder for a dispensing tip attached to a tip of a pipette, comprising:
    a peripheral wall having a shape surrounding an outer peripheral surface of the dispensing tip; and
    an insertion portion having an insertion opening into which the dispensing tip is to be inserted,
    wherein the peripheral wall has a first end into which the dispensing tip is to be inserted, and has a second end provided at a position opposite to the first end, the insertion portion is formed in the peripheral wall such that an outer peripheral surface of the dispensing tip abuts against an edge of the insertion opening, and is formed in the peripheral wall such that a tip of the dispensing tip does not project from the second end of the peripheral wall, when the dispensing tip is inserted into the insertion opening from the first end, an inner diameter of the insertion opening is smaller than a maximum outer diameter of the dispensing tip, and the second end of the peripheral wall has a support surface configured to contact with a fixed surface by pressing the pipette downwardly with the suitable force.

2. The dispensing tip holder according to claim 1, wherein the peripheral wall is cylindrical.

3. The dispensing tip holder according to claim 1, wherein the first end of the peripheral wall has an annular abutment surface that abuts against an outer peripheral surface of the dispensing tip, and the insertion portion includes the abutment surface of the peripheral wall such that the insertion opening of the insertion portion is an opening surrounded by the abutment surface.

4. The dispensing tip holder according to claim 1, further comprising:
    a support plate provided at the second end of the peripheral wall.

5. The dispensing tip holder according to claim 1, wherein the insertion portion is provided in the peripheral wall such that the insertion opening is positioned at a position spaced apart from the first end in the peripheral wall.

6. The dispensing tip holder according to claim 1, further comprising:
    a lid configured to be attached and detached from the first end of the peripheral wall.

7. The dispensing tip holder according to claim 2, wherein the first end of the peripheral wall has an annular abutment surface that abuts against an outer peripheral surface of the dispensing tip, and the insertion portion includes the abutment surface of the peripheral wall such that the insertion opening of the insertion portion is an opening surrounded by the abutment surface.

8. The dispensing tip holder according to claim 2, further comprising:
    a support plate provided at the second end of the peripheral wall.

9. The dispensing tip holder according to claim 2, wherein the insertion portion is provided in the peripheral wall such that the insertion opening is positioned at a position spaced apart from the first end in the peripheral wall.

10. The dispensing tip holder according to claim 2, further comprising:
    a lid configured to be attached and detached from the first end of the peripheral wall.

11. The dispensing tip holder according to claim 3, further comprising:
    a support plate provided at the second end of the peripheral wall.

12. The dispensing tip holder according to claim 3, wherein the insertion portion is provided in the peripheral wall such that the insertion opening is positioned at a position spaced apart from the first end in the peripheral wall.

13. The dispensing tip holder according to claim 3, further comprising:
    a lid configured to be attached and detached from the first end of the peripheral wall.

14. The dispensing tip holder according to claim 4, wherein the insertion portion is provided in the peripheral wall such that the insertion opening is positioned at a position spaced apart from the first end in the peripheral wall.

15. The dispensing tip holder according to claim 4, further comprising:

a lid configured to be attached and detached from the first end of the peripheral wall.

16. The dispensing tip holder according to claim 5, further comprising:
a lid configured to be attached and detached from the first end of the peripheral wall.

17. A dispensing tip holder for a dispensing tip attached to a tip of a pipette, comprising:
a cylindrical body having a peripheral wall configured to surround an outer peripheral surface of the dispensing tip and having an insertion portion such that the insertion portion has an insertion opening configured to insert the dispensing tip,
wherein the cylindrical body has a first end configured to insert the dispensing tip and a second end on an opposite side with respect to the first end such that a tip of the dispensing tip does not project from the cylindrical body when the dispensing tip is held in the cylindrical body, the insertion portion is formed in the peripheral wall such that a portion of an outer peripheral surface of the dispensing tip abuts against an edge of the insertion opening and that the cylindrical body forms a space between the peripheral wall and a main body of the dispensing tip accommodated inside the peripheral wall, and the second end of the peripheral wall has a support surface configured to contact with a fixed surface by pressing the pipette downwardly with the suitable force.

18. The dispensing tip holder according to claim 17, wherein the first end of the peripheral wall has an annular abutment surface that abuts against an outer peripheral surface of the dispensing tip, and the insertion portion includes the abutment surface of the peripheral wall such that the insertion opening of the insertion portion is an opening surrounded by the abutment surface.

19. The dispensing tip holder according to claim 17, further comprising:
a support plate provided at the second end of the peripheral wall.

20. The dispensing tip holder according to claim 18, further comprising:
a support plate provided at the second end of the peripheral wall.

* * * * *